(12) United States Patent
Hacker et al.

(10) Patent No.: US 6,739,978 B2
(45) Date of Patent: May 25, 2004

(54) WHEEL HUB/JOINT UNIT WITH CLAMPING AND SEPARATING DEVICE

(75) Inventors: Robert W. Hacker, Canton, OH (US); Mark Joki, Dover, OH (US)

(73) Assignee: The Timken Company, Canton, OH (US)

(*) Notice: Subject to any disclaimer, the term of this patent is extended or adjusted under 35 U.S.C. 154(b) by 0 days.

(21) Appl. No.: 09/967,182

(22) Filed: Sep. 28, 2001

(65) Prior Publication Data

US 2003/0064817 A1 Apr. 3, 2003

(51) Int. Cl.$^7$ .................................................. F16D 3/84
(52) U.S. Cl. ....................................... 464/178; 464/906
(58) Field of Search ................................. 464/146, 145, 464/178, 906, 140; 403/374.3; 301/105.1; 384/544

(56) References Cited

U.S. PATENT DOCUMENTS

| | | |
|---|---|---|
| 3,586,357 A | 6/1971 | Orain |
| 4,172,621 A | 10/1979 | Yoshida |
| 4,460,058 A | 7/1984 | Welschof et al. |
| 4,493,388 A | 1/1985 | Welschof et al. |
| 4,732,497 A | 3/1988 | Sawa et al. |
| 4,765,688 A | 8/1988 | Hofmann et al. |
| 5,052,979 A | 10/1991 | Welschof et al. |
| 5,536,098 A | 7/1996 | Schwarzler |
| 5,549,514 A | 8/1996 | Welschof |
| 5,620,263 A | 4/1997 | Ohtsuki et al. |
| 5,806,936 A | 9/1998 | Guimbretiere |
| 5,853,250 A | 12/1998 | Krude et al. |
| 5,974,665 A | 11/1999 | Frielingsdorf et al. |
| 6,012,986 A | 1/2000 | Guimbretiere |
| 6,022,275 A | 2/2000 | Bertetti |
| 6,139,216 A | 10/2000 | Bertetti |
| 6,152,825 A * | 11/2000 | Doell ........................ 301/105.1 |
| 6,170,628 B1 * | 1/2001 | Bigley ........................ 180/247 |
| 6,186,899 B1 | 2/2001 | Thomas et al. |
| 6,193,419 B1 | 2/2001 | Krude et al. |
| 6,203,441 B1 | 3/2001 | Iarrera |
| 6,261,184 B1 | 7/2001 | Jacob et al. |
| 6,273,825 B1 * | 8/2001 | Schwarzler et al. ......... 464/139 |
| 6,422,657 B2 * | 7/2002 | Di Ponio et al. ......... 301/105.1 |
| 6,450,585 B1 * | 9/2002 | Kochsiek ..................... 180/258 |
| 6,481,896 B1 * | 11/2002 | Ohtsuki et al. .............. 384/484 |
| 6,485,188 B1 * | 11/2002 | Dougherty ................... 384/589 |
| 6,497,515 B1 * | 12/2002 | Sahashi et al. ............. 384/544 |
| 6,524,012 B1 * | 2/2003 | Uchman ..................... 384/544 |
| 2002/0106140 A1 * | 8/2002 | Uchman ..................... 384/544 |

FOREIGN PATENT DOCUMENTS

| | | |
|---|---|---|
| EP | 1018630 | 7/2000 |
| GB | 2191267 | 12/1987 |

* cited by examiner

*Primary Examiner*—Lynne H. Browne
*Assistant Examiner*—Aaron Dunwoody
(74) *Attorney, Agent, or Firm*—Polster, Lieder, Woodruff & Lucchesi, L.C.

(57) ABSTRACT

A hub/bearing unit 20 including a housing 22 and a hub 24 having a flange 27, an inboard surface 29 and a centrally located bore 25. A constant velocity joint 10 provides an inner joint member 14 attached to a shaft 16, an outer joint member 12 disposed about the inner joint member 14, a plurality of balls 15 between the inner joint member 14 and the outer joint member 12 wherein the balls 15 transmit rotational force between the inner joint member 14 and the outer joint member 12, respectively. An attachment device 52 has a threaded portion 54 and a shoulder portion 56. The shoulder portion 56 contacts a backing surface 60 of the constant velocity joint 10 to attach the constant velocity joint 10 to the hub/bearing unit 20.

31 Claims, 7 Drawing Sheets

WHEEL HUB/JOINT UNIT WITH CLAMPING AND SEPARATING DEVICE

TECHNICAL FIELD

The present invention relates generally to a constant velocity joint and hub/bearing unit assembly. More specifically, it relates to a constant velocity joint and a hub/bearing unit that are attached and detached by a novel device.

BACKGROUND OF THE INVENTION

A typical constant velocity joint 110, such as shown in FIG. 1, has a spindle 112 projecting through a hub 114. In this configuration, external access to the constant velocity joint 110 is provided for clamping the joint 110 to the hub 114 by tightening a nut 116 on an end of the spindle 112. To separate the joint 110 from the hub 114, the nut 116 is removed and force applied to the spindle 112 to remove it from the hub 114. These designs fail to meet current demands for lighter, less expensive constant velocity joint and hub units.

Modern designs, such as that disclosed in U.S. Pat. No. 6,203,441, have attempted to meet these demands. An embodiment of the U.S. Pat. No. 6,203,441 patent is shown in FIG. 2. The embodiment comprises a hub 120, a constant velocity joint 122 and an intermediate ring 124. The intermediate ring 124 is splined to the hub 120, and the constant velocity joint 122 is splined to the intermediate ring 124. The constant velocity joint 122 is attached to the intermediate ring 124 by a bistable elastic element 126 moveable between a first position A and second position B. In the first position, hooking members 128 of the element 126 attach the ring 124 to the joint 122. In the second position B, the hooks 128 no longer attach the joint 122 to the ring 124, and the joint 122 may be removed. However, it is difficult to remove the rotational backlash in the splined connection between the constant velocity joint 122 and the intermediate ring 124 without making assembly and disassembly very difficult. Furthermore, if the splines become corroded it will be difficult to remove the constant velocity joint 122 from the intermediate ring.

Other attempts have been made in the past to overcome the shortcomings of the prior art. For example, U.S. Pat. No. 3,586,357, in FIG. 2 of that patent, discloses a system whereby a central screw 84 is press-fitted into a bowl 85 of a transmission joint and facial teeth 87 are used to prevent rotation of the screw. A nut 86 is used to attach the screw to a hub. However, this varies from the prior art only slightly, as a screw pressed into a constant velocity joint varies only slightly from a constant velocity joint with an integrally formed spindle. The disclosure of the '357 also requires the use of a very long screw in order to maintain proper tension on the threads of the nut and bolt to prevent the nut from coming loose. The long screw does provide extra weight and axial width, making the system of the '357 patent unacceptable.

U.S. Pat. No. 6,146,022 discloses a constant velocity joint attached to a hub/bearing unit. However, the constant velocity of '022 patent may not be removed from assembly without disassembling the hub/bearing unit. As a result, the assembly of the '022 patent is inferior to the present invention because the constant velocity joint is not separately serviceable from the hub/bearing unit. In constant velocity joints, the weak link is the boot that maintains lubrication within the constant velocity joint and protects the constant velocity joint from contamination. If a boot fails, the constant velocity joint fails. In the case of the '022 patent, the whole bearing assembly, or at least the inboard inner race, must be replaced in addition to the constant velocity joint.

SUMMARY OF THE INVENTION

In a first aspect, the present invention comprises an assembly comprising a hub/bearing unit, a constant velocity joint and an attachment device. The hub/bearing unit comprises a housing and a hub. The hub comprises a centrally located bore and a flange having an inboard surface. The hub/bearing unit further comprises a plurality of rolling elements between the housing and the hub that rotatingly support the hub within the housing. The constant velocity joint comprises an inner joint, an outer joint member disposed about the inner joint member, and a plurality of balls between the inner joint member and the outer joint member. The balls transmit rotational force between the inner joint member and the outer joint member. The attachment device has a threaded portion and a shoulder portion, wherein the shoulder portion contacts a backing surface of the constant velocity joint to attach the constant velocity joint to the hub/bearing unit. The attachment device does not extend beyond a plane defined by the inboard surface of the flange when the attachment device is installed within the assembly.

In a second aspect, the present invention comprises a device for attaching a constant velocity joint comprising an outer joint member having a backing surface on an internal surface thereof to a hub/bearing unit comprising a hub with a centrally located threaded bore. The device comprises an attachment device with a threaded portion, a shoulder portion and an end portion. The threaded portion is adapted to be threaded into the centrally located threaded bore to, in cooperation with the shoulder portion, maintain the attachment device in a fixed relationship with the constant velocity joint and the hub/bearing unit. The shoulder portion is adapted to abut a backing surface of the outer joint member to hold the outer joint member in a fixed relationship with the hub/bearing unit. The end portion is adapted to contact the constant velocity joint to force separation of the constant velocity joint from the hub when an axial force is applied thereto.

In a third aspect, the present invention provides a method of separating a constant velocity joint from a hub/bearing unit comprising four steps: a) providing a hub/bearing unit, b) providing a constant velocity joint, c) providing an attachment device for attaching the constant velocity joint to the hub/bearing unit, the attachment device comprising a shoulder portion and a threaded portion, and d) clamping the constant velocity joint to the hub/bearing unit wherein the attachment device, constant velocity joint and hub/bearing unit are adapted to apply an axial force to the constant velocity joint to remove the constant velocity joint from the hub/bearing unit as the attachment device is disengaged from the hub/bearing unit.

In a fourth aspect, the present invention comprises an assembly comprising a hub/bearing unit, a constant velocity joint and an attachment device. The hub/bearing unit comprises a housing and a hub comprising a centrally located bore and a flange having an inboard surface. The hub/bearing unit further comprises a plurality of rolling elements between the housing and the hub that rotatingly support the hub within the housing. Finally, the hub/bearing unit comprises splines on an external diameter of the hub. The constant velocity joint comprises an inner joint, an outer joint member disposed about the inner joint member. A plurality of balls is disposed between the inner joint member and the outer joint member wherein the balls transmit rotational force between the inner joint member and the outer joint member. The constant velocity joint further comprises splines on an external diameter thereof that mesh with the internal splines of the hub/bearing unit. The attachment device comprises a threaded portion and a shoulder portion, wherein the shoulder portion contacts a backing surface of the constant velocity joint to clamp the constant velocity joint to the hub/bearing unit. The attachment device is adapted to exert an axial force to the constant velocity joint in order to remove the constant velocity joint from the hub/bearing unit.

DETAILED DESCRIPTION OF THE PREFERRED EMBODIMENT

Figure 1:
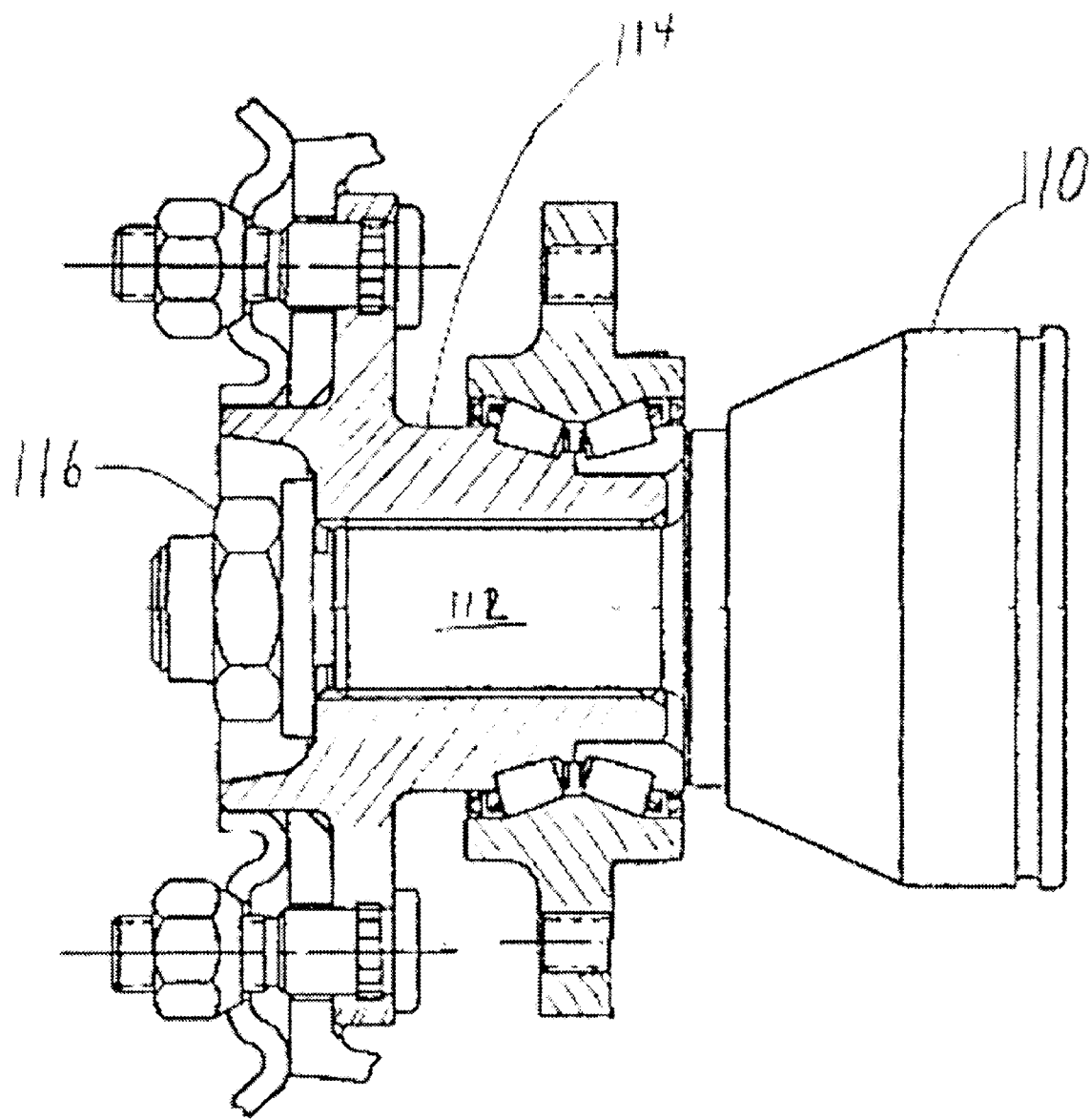
FIG. 1 is a side sectional view of a constant velocity joint having a spindle attached to a hub/bearing unit according to the prior art.
Figure 2:
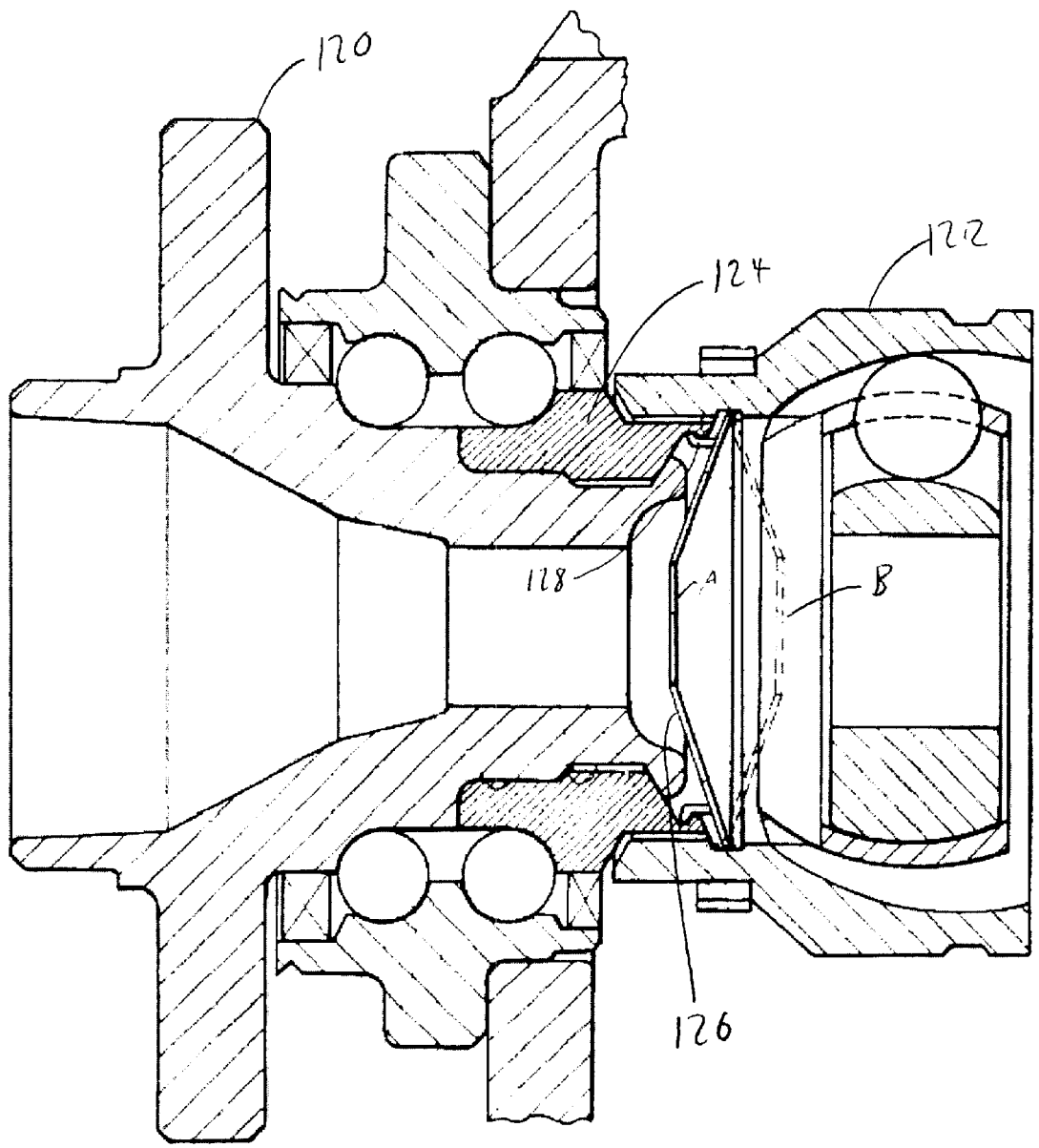
FIG. 2 is a side sectional view of a spindleless constant velocity joint attached to a hub/bearing unit according to the prior art.

While the invention is capable of embodiment in many different forms, there is shown in the drawings and will herein be described in detail preferred embodiments of the invention. It is to be understood that the present disclosure is to be considered only as an example of the principles of the invention. This disclosure is not intended to limit the broad aspect of the invention to the illustrated embodiments. The scope of protection should only be limited by the accompanying claims.

Figure 3:
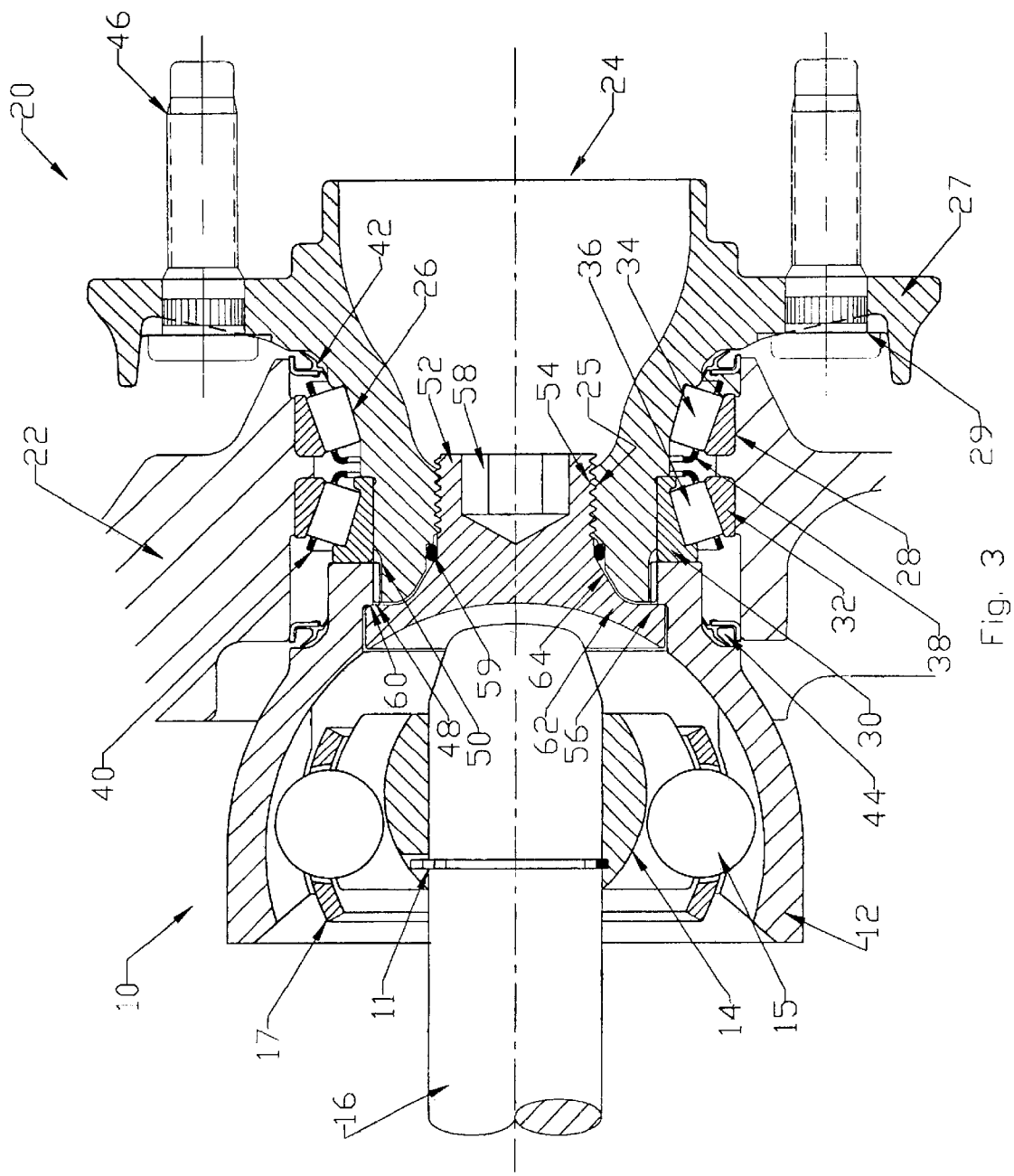
FIG. 3 is a side sectional view of a spindleless constant velocity joint attached to a hub/bearing unit according to the first embodiment of the present invention.

Referring to FIG. 3, there is provided a constant velocity joint 10 having an outer joint member 12 and an inner joint member 14. Between the inner joint member 14 and the outer joint member 12 are balls 15, which are maintained in relative position to each other by a cage 17. A shaft 16 is attached to the inner joint member 14 by a snap ring 11. The shaft 16, rather than terminating within the inner joint member 14, extends beyond the inner joint member 14. For the purposes of the present application, the shaft 16 is considered a portion of the constant velocity joint 10. The constant velocity joint 10 operates in the same fashion as known constant velocity joints. In the present embodiment, the cage 17 is preferably in the general form of a zone of a sphere. The zone of a sphere is defined as the portion of a sphere contained between two parallel planes both intersecting the sphere.

Also provided is a hub/bearing unit 20. The hub/bearing unit 20 comprises a housing 22 and a hub 24 having a threaded bore 25. The hub 24 is rotatingly supported within the housing 22 by an outboard integral inner raceway 26, an outboard outer race 28, an inboard inner race 30 and an inboard outer race 32. Between the raceway 26 and race 28 are located rolling elements 34 maintained in a spaced relationship by a cage 38, and between the races 30 and 32 are located rolling elements 36 maintained in a spaced relationship by a cage 40. There are also provided grease seals 42, 44 and lugs 46 for attaching a wheel (not shown).

While it is shown in FIG. 3 that the raceway 26 is integral with the hub 24, race 30 is non-integral with the hub 24, and races 28, 32 are non-integral with the housing 22, it will be readily apparent and understood by one of ordinary skill in the art that integral and non-integral races are interchangeable for the purposes of the present invention. Additionally while it is shown that the rolling elements are tapered rollers, it will similarly be apparent to one of ordinary skill in the art that the rolling elements could be balls or cylindrical rollers without departing from the scope of the present invention.

An exterior diameter of the hub 24 further defines external splines 48 that mate with internal splines 50 defined by an interior diameter of the outer joint member 12. The splines 48, 50 are preferably tight fitting splines. The splines 48, 50 are preferably straight splines with the exception of one spline having a slight helix to remove backlash in the splines. An attachment device 52 attaches the constant velocity joint 10 and the hub 24. The attachment device 52 comprises a threaded portion 54 and a shoulder portion 56. Preferably, the attachment device 52 also comprises a narrowed portion 62 near a tapered portion 64 that allows the attachment device 52 to spring and, therefore, stretch as the device 52 is installed. The stretch of the attachment device 52 keeps pressure on the threaded portion 54 and prevents the attachment device 52 from becoming disengaged from the hub 24. The attachment device 52 also defines a non-circular cavity 58, preferably a hexagonally shaped cavity. The cavity 58 is capable of receiving a torque tool for rotating the attachment device 52 within the threaded bore 25. Alternatively, the cavity 58 can be replaced by a non-circular extension, such as a hex-shaped extension, for receiving a socket driver. Finally, the attachment device 52 may optionally comprise an O-ring 59 for preventing contaminants from entering the constant velocity joint 10.

To assemble the present invention, the hub/bearing unit 20 is provided having the hub 24 pre-mounted within the housing 22 and capable of rotation therein. Next, the outer joint member 12 is attached to the hub 24 such that the internal splines 48 of the outer joint member 12 mesh with the external splines 50 of the hub 24. The attachment device 52 is then threaded into the threaded bore 25 until the shoulder portion 56 abuts a backing surface 60 of the outer joint member 12 thereby drawing together the tight splined connection provided by splines 48, 50. The cage 17 and inner joint member 14 are installed within the outer joint member 12, and the balls 15 subsequently installed. The shaft 16 may then be attached to the inner joint member 14 by the snap ring 11. The shaft 16 and the inner joint member 14 both comprise splines (not shown) that cooperate to prevent relative rotational motion between the shaft 16 and the inner joint member 14.

Alternatively, attachment device 52 can be inserted inside outer joint member 12. Inner joint member 14, cage 17, and balls 15 are then assembled inside outer joint member 12. Shaft 16 is assembled in the inner joint member 14 and held in place by the snap ring 11. Finally, this sub-assembly is positioned adjacent to the hub/bearing unit 20. A tool is inserted in cavity 58 to draw the constant velocity joint 10 firmly against the hub/bearing unit 20 and mesh the splines 48, 50.

Figure 4:
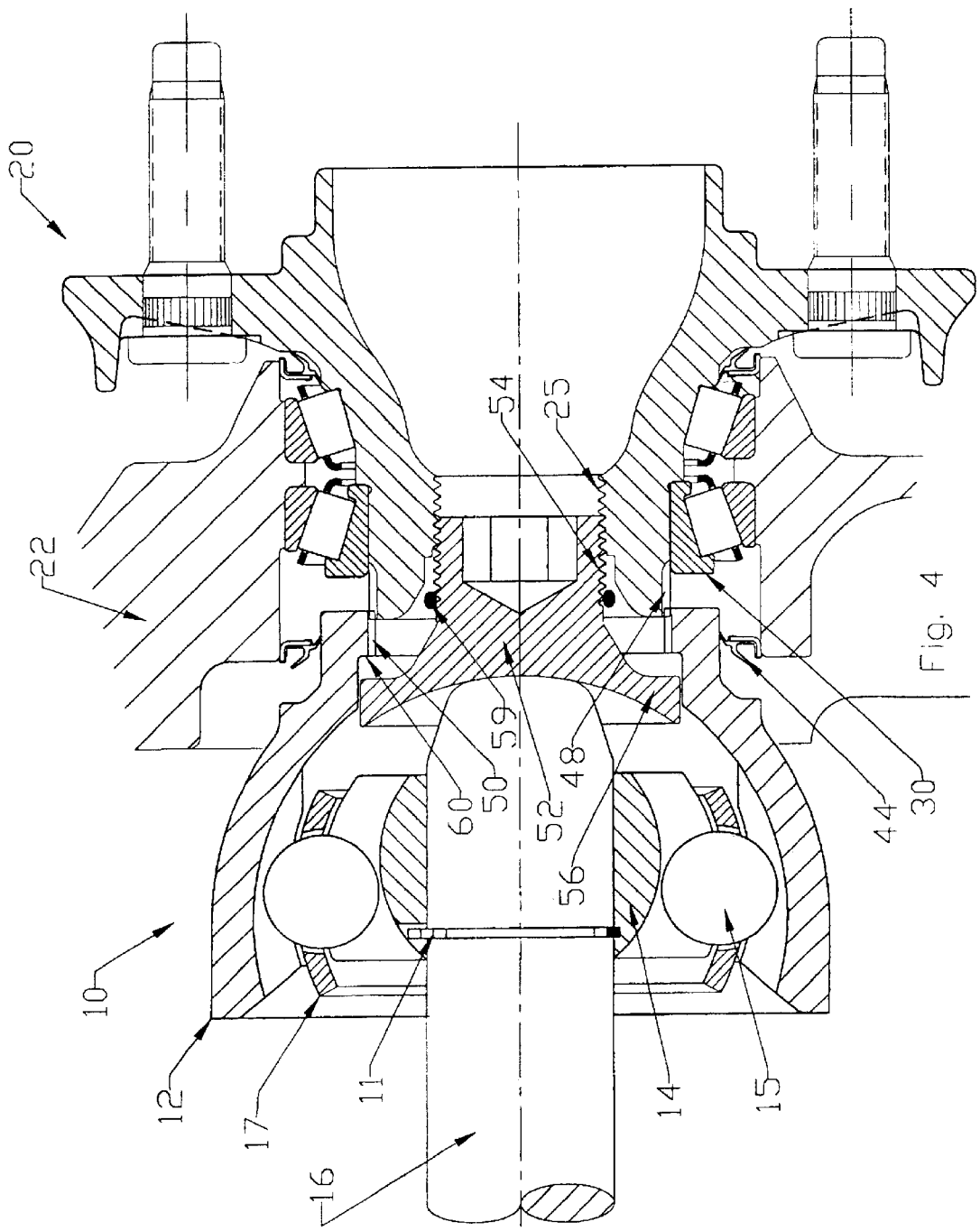
FIG. 4 is a side sectional view of a spindleless constant velocity joint at a point in the removal process from a hub/bearing unit according to the first embodiment of the present invention.

A technician can disassemble the present assembly with access to only the hub-side of the assembly. This is accomplished by rotating the attachment device 52 to threadingly disengage the attachment device 52 from the hub 24, as in FIG. 4. As the attachment device 52 contacts the shaft 16, further rotation of the attachment device 52 forces the constant velocity joint 10 apart from the hub/bearing unit 20. Therefore, the threaded portion 54 and the threaded bore 25 are dimensioned such that the threaded portion 54 and the threaded bore 25 remain engaged until the constant velocity joint 10 is completely disengaged from the hub/bearing unit 20. However, it is within the scope of the present invention that the threaded portion 54 and the threaded bore 25 become disengaged at a point that provides for partial removal of the constant velocity joint 10 from the hub/bearing unit 20.

Figure 5:
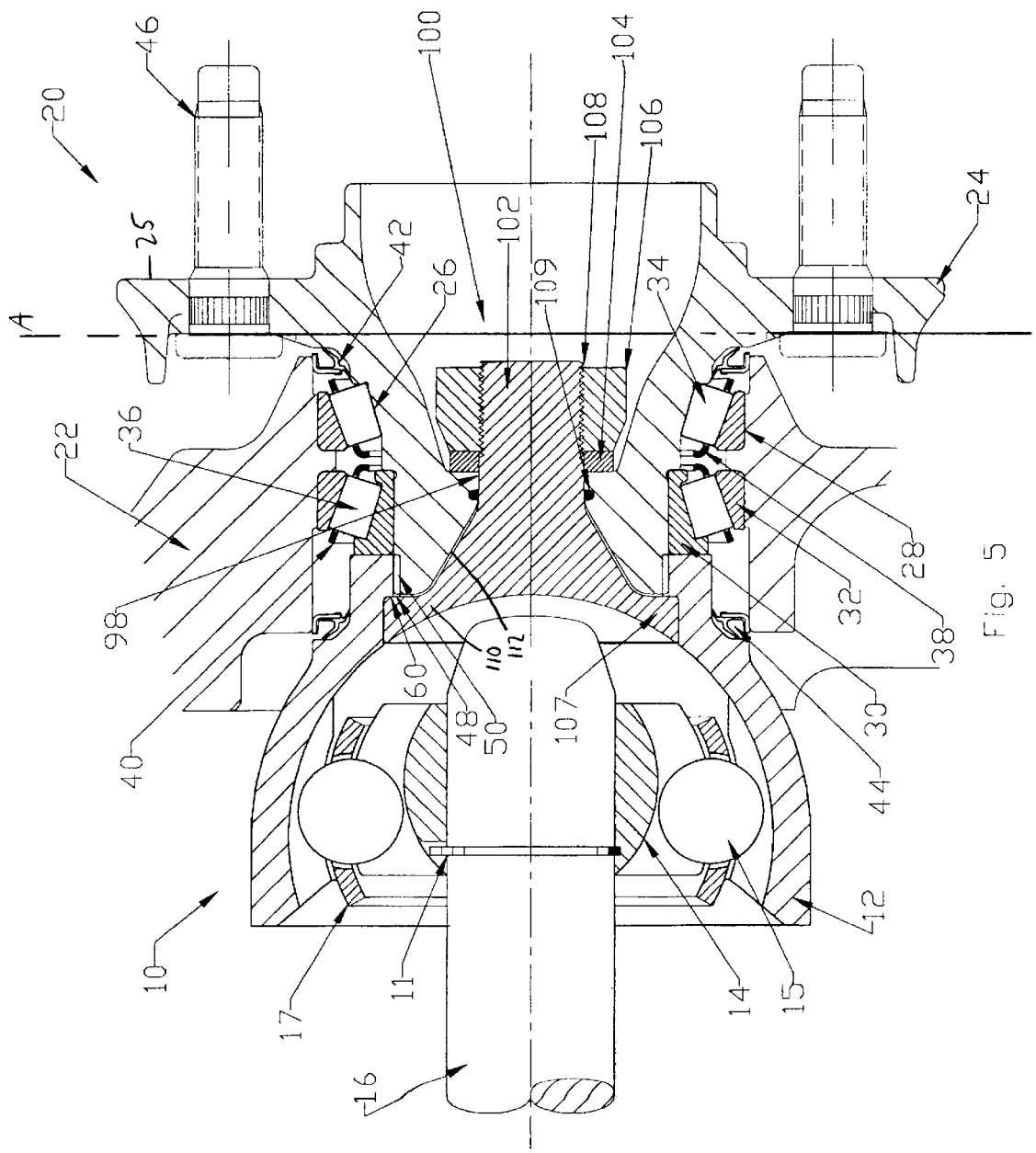
FIG. 5 is a side sectional view of a spindleless constant velocity joint attached to a hub/bearing unit according to a second embodiment of the present invention.

Referring to FIG. 5, a second embodiment of the invention is shown and described. The second embodiment comprises a constant velocity joint 10 and hub/bearing unit 20 similar to the embodiment of FIG. 3 except that attachment device 52 is replaced with attachment device 100 and threaded bore 25 of the hub 24 is replaced with a non-threaded bore 98. Attachment device 100 comprises attaching member 102, washer 104 and attaching nut 106. The attaching member 102 comprises a shoulder portion 107 and a threaded portion 108. Optionally, the attaching member 102 may further comprise an O-ring 109. As with the attachment device 52, attachment device 100 may optionally comprise a narrowed portion 110 and a tapered portion 112.

To assemble the assembly of the second embodiment, the hub/bearing unit 20 is provided having the hub 24 pre-mounted within the housing 22 and capable of rotation therein. Next, the outer joint member 12 is attached to the hub 24 such that internal splines 48 of the outer joint member 12 mesh with the external splines 50 of the hub 24. The attaching member 102 is then inserted through the bore 98 from within the outer joint member 12 until the shoulder portion 107 abuts the backing surface 60 of the outer joint member 12. The washer 104 is placed over the threaded portion 108 and the nut 106 is threaded and torqued onto the threaded portion 108 to attach the assembly. The inner joint member 14 and cage 17 are inserted within the outer joint member 12, and then the balls 15 are installed. Finally, the shaft 16 is inserted in the inner joint member 14 and attached with the snap ring 11. The shaft 16 and the inner joint member 14 both comprise splines (not shown) that cooperate to prevent relative rotational motion between the shaft 16 and the inner joint member 14. A technician may also disassemble this embodiment by access to the hub-side of the assembly. This is accomplished by removing the nut 106 from the attaching member 102. Next, the attaching member can be struck with a rubber mallet or the like thereby forcing the attaching member 102 against the shaft 16. The force from the rubber mallet is translated to the shaft 16 and the constant velocity joint 10, which forces the outer joint member 12 away from the hub 24 in similar fashion as FIG. 4.

Figure 6:
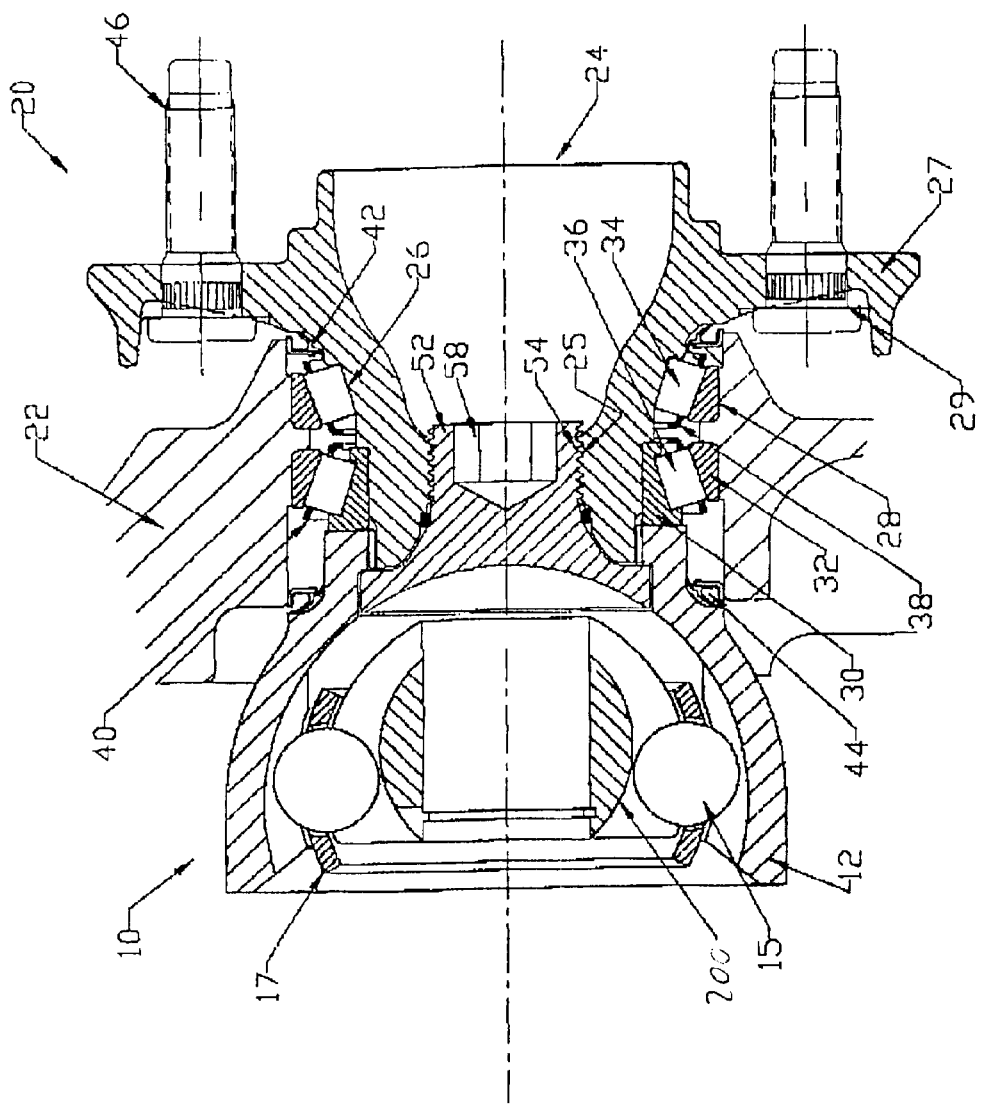
FIG. 6 is a side sectional view of a spindleless constant velocity joint attached to a hub/bearing unit according to a third embodiment of the present invention.

Referring to FIG. 6, a third embodiment of the invention is shown and described. The third embodiment generally comprises a constant velocity joint 10, hub/bearing unit 20 and an attachment device 52 as in the first embodiment. However, the constant velocity joint 10 comprises an extended inner joint member 200 in place of the inner joint member 14. The extended inner joint member 200 extends beyond or even with the end of the shaft 16. When disassembling the constant velocity joint 10 from hub/bearing unit 20 by rotating the attachment device 52 within the threaded bore 25, the attachment device 52 contacts the extended inner joint member 200 rather than the shaft 16 to apply axial force to the constant velocity joint 10. It will also be appreciated by one of ordinary skill in the art that the extended inner joint member 200 of the third embodiment may be used in conjunction with the attachment device 100 of the second embodiment.

Figure 7:
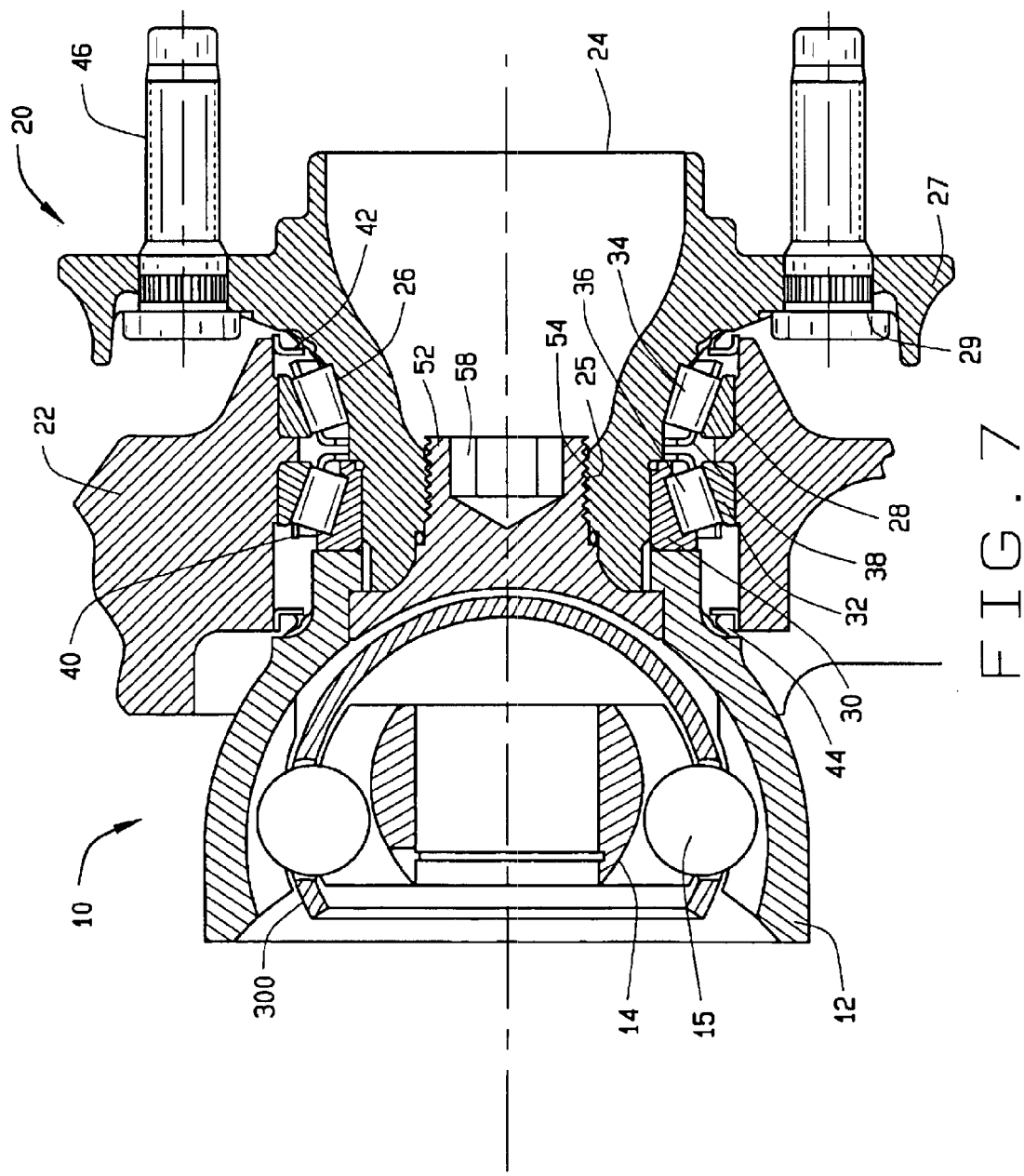
FIG. 7 is a side sectional view of a spindleless constant velocity joint attached to a hub/bearing unit according to a second embodiment of the present invention.

Referring to FIG. 7, a fourth embodiment of the invention is shown and described. The fourth embodiment generally comprises a constant velocity joint 10, hub/bearing unit 20 and an attachment device 52 as in the first embodiment. However, the constant velocity joint 10 comprises a cage 300 generally shaped in the form of a segment of a sphere. A segment of a sphere is defined as one of the part-spherical portions into which a sphere is divided by a plane that intersects it. As a result, a portion of the cage 300 extends adjacent to the attachment device 52. When disassembling the constant velocity joint 10 from hub/bearing unit 20 by rotating the attachment device 52 within the threaded bore 25, the attachment device 52 contacts the adjacent portion of the cage 52 to apply axial force to the constant velocity joint 10. It will also be appreciated by one of ordinary skill in the art that the segment-of-a-sphere-shaped cage 300 of the present embodiment may be used in conjunction with the attachment device 100 of the second embodiment.

The present invention makes improvements over the prior art by using a novel method for reducing unsprung weight in the attachment of a constant velocity joint to a hub/bearing unit. The attachment device of the present invention attains these goals while maintaining easy assembly and serviceability. It further makes practical the use of tight splines, which are preferable to loose fitting splines, by provided the ability to easily draw the splines together during assembly and to separate the splines during disassembly. The present lighter and smaller attachment device preferably is small enough that it does not extend beyond a plane A (FIG. 5) defined by an inboard 29 surface of a flange 27 of the hub 24.

While the specific embodiments have been illustrated and described, numerous modifications come to mind without significantly departing from the spirit of the invention, and the scope of protection is only limited by the scope of the accompanying claims.

We claim:

1. An assembly comprising:
    a hub/bearing unit comprising a housing and a hub comprising a centrally located bore and a flange having an inboard surface, the hub/bearing unit further comprising a plurality of rolling elements between the housing and the hub that rotatingly support the hub within the housing, the hub/bearing unit having an inboard and an outboard side;
    a constant velocity joint comprising an inner joint member, an outer joint member disposed about the inner joint member, and a plurality of balls between the inner joint member and the outer joint member wherein the balls transmit rotational force between the inner joint member and the outer joint member;
    an attachment device having a treaded portion and a shoulder portion, wherein the shoulder portion contacts a backing surface of the constant velocity joint to attach the constant velocity joint to the hub/bearing unit and wherein the attachment device does not extend beyond a plane defined by the inboard surface of the flange when the attachment device is installed within the assembly; and wherein the attachment device is accessible for removal from the outboard side of the hub/bearing unit.

2. The assembly of claim 1 wherein the bore of the hub/bearing unit is a threaded bore and the threaded portion of the attachment device is attached to the hub at the threaded bore and the shoulder portion holds the outer joint member in a fixed relationship to the hub.

3. An assembly comprising:
a hub/bearing unit comprising a housing and a hub comprising a centrally located bore and a flange having an inboard surface, the hub/bearing unit further comprising a plurality of rolling elements between the housing and the hub that rotatingly support the hub within the housing;
a constant velocity joint comprising an inner joint member, an outer joint member disposed about the inner joint member, and a plurality of balls between the inner joint member and the outer joint member wherein the balls transmit rotational force between the inner joint member and the outer joint member;
an attachment device having a threaded portion and a shoulder portion, wherein the shoulder portion contacts a backing surface of the constant velocity joint to attach the constant velocity joint to the hub/bearing unit and wherein the attachment device does not extend beyond a plane defined by the inboard surface of the flange when the attachment device is installed within the assembly; and
wherein the attaching member and the hub/bearing unit are adapted such that, as the attachment device is threadingly disengaged from the hub/bearing unit, contact is made with a component of the constant velocity joint to force the constant velocity joint to separate from the hub/bearing unit.

4. An assembly comprising:
a hub/bearing unit comprising a housing and a hub comprising a centrally located bore and a flange having an inboard surface, the hub/bearing unit further comprising a plurality of rolling elements between the housing and the hub that rotatingly support the hub within the housing;
a constant velocity joint comprising an inner joint member, an outer joint member disposed about the inner joint member, and a plurality of balls between the inner joint member and the outer joint member wherein the balls transmit rotational force between the inner joint member and the outer joint member;
an attachment device having a threaded portion and a shoulder portion, wherein the shoulder portion contacts a backing surface of the constant velocity joint to attach the constant velocity joint to the hub/bearing unit and wherein the attachment device does not extend beyond a plane defined by the inboard surface of the flange when the attachment device is installed within the assembly; and
wherein the attachment device comprises an attaching member and attaching nut and the shoulder portion and threaded portion are located on the attaching member.

5. The assembly of claim 4 wherein the attaching member and the hub/bearing unit are adapted such that after the nut has been removed, the attaching member is capable of making contact with a component of the constant velocity joint to force the constant velocity joint to separate from the hub/bearing unit.

6. The assembly of claim 1 wherein the rolling elements comprise tapered rollers.

7. The assembly of claim 1 wherein the rolling elements comprise balls.

8. The assembly of claim 1 wherein the attachment device further comprises a non-circular shaped cavity capable of receiving a driver tool for rotation of the attachment device.

9. The assembly of claim 1 further comprising a sealing member disposed about the attachment device at the base of the threaded portion.

10. An assembly comprising:
a hub/bearing unit comprising a housing and a hub comprising a centrally located bore and a flange having an inboard surface, the hub/bearing unit further comprising a plurality of rolling elements between the housing and the hub that rotatingly support the hub within the housing;
a constant velocity joint comprising an inner joint member, an outer joint member disposed about the inner joint member, and a plurality of balls between the inner joint member and the outer joint member wherein the balls transmit rotational force between the inner joint member and the outer joint member;
an attachment device having a threaded portion and a shoulder portion, wherein the shoulder portion contacts a backing surface of the constant velocity joint to attach the constant velocity joint to the hub/bearing unit and wherein the attachment device does not extend beyond a plane defined by the inboard surface of the flange when the attachment device is installed within the assembly; and
wherein the attachment device and the hub/bearing unit are adapted such that, as the attachment device is removed from the hub/bearing unit, the attachment device contacts a shaft attached to the inner joint member to force separation of the constant velocity joint from the hub.

11. An assembly comprising:
a hub/bearing unit comprising a housing and a hub comprising a centrally located bore and a flange having an inboard surface, the hub/bearing unit further comprising a plurality of rolling elements between the housing and the hub that rotatingly support the hub within the housing;
a constant velocity joint comprising an inner joint member, an outer joint member disposed about the inner joint member, and a plurality of balls between the inner joint member and the outer joint member wherein the balls transmit rotational force between the inner joint member and the outer joint member;
an attachment device having a threaded portion and a shoulder portion, wherein the shoulder portion contacts a backing surface of the constant velocity joint to attach the constant velocity joint to the hub/bearing unit and wherein the attachment device does not extend beyond a plane defined by the inboard surface of the flange when the attachment device is installed within the assembly; and
wherein the inner joint member comprises an extended inner joint member and wherein the attachment device and the hub/bearing unit are adapted such that, as the attachment device is removed from the hub/bearing unit, the attachment device contacts the extended inner joint member to force separation of the constant velocity joint from the hub.

12. An assembly comprising:
a hub/bearing unit comprising a housing and a hub comprising a centrally located bare and a flange having an inboard surface, the hub/bearing unit further comprising a plurality of rolling elements between the housing and the hub that rotatingly support the hub within the housing;
a constant velocity joint comprising an inner joint member, an outer joint member disposed about the inner joint member, and a plurality of balls between the inner joint member and the outer joint member wherein the balls transmit rotational force between the inner joint member and the outer joint member;
an attachment device having a threaded portion and a shoulder portion, wherein the shoulder portion contacts a backing surface of the constant velocity joint to attach the constant velocity joint to the hub/bearing unit and wherein the attachment device does not extend beyond a plane defined by the inboard surface of the flange when the attachment device is installed within the assembly; and
wherein the constant velocity joint further comprises a segment-of a-sphere-shaped cage and wherein the attachment device and the hub/bearing unit are adapted such that, as the attachment device is removed from the hub/bearing unit, the attachment device contacts the cage to force separation of the constant velocity joint from the hub.

13. A device for attaching a constant velocity joint comprising an outer joint member having a backing surface on an internal surface thereof to a hub/bearing unit comprising a hub with a centrally located threaded bore, the device comprising:
an attachment device with a threaded portion, a shoulder portion and an end portion wherein:
the threaded portion is adapted to be threaded into the centrally located threaded bore to, in cooperation with the shoulder portion, maintain the attachment device in a fixed relationship with the constant velocity joint and the hub/bearing unit;
the shoulder portion is adapted to abut a backing surface of the outer joint member to hold the outer joint member in a fixed relationship with the hub/bearing unit, and
the end portion is adapted to contact the constant velocity joint to force separation of the constant velocity joint from the hub when an axial force is applied thereto.

14. The device of claim 13 wherein the threaded portion of the attachment device is threaded into the threaded centrally located bore to attach the attaching member to the hub/bearing unit.

15. The device of claim 14 wherein the constant velocity joint further comprises a shaft wherein the end portion and threaded portion of the attachment device are adapted to force separation of the constant velocity joint from the hub as the attachment device is threadingly removed from the hub by abutting and forcing movement of the shaft in relation to the hub.

16. The device of claim 14 wherein the constant velocity joint further comprises an extended inner joint member wherein the end portion and threaded portion of the attachment device are adapted to force separation of the constant velocity joint from the hub as the attachment device is threadingly removed from the hub by abutting and forcing movement of the inner joint member in relation to the hub.

17. The device of claim 14 wherein the constant velocity joint further comprises a segment-of-a-sphere-shaped cage wherein the end portion and threaded portion of the attachment device are adapted to force separation of the constant velocity joint from the hub as the attachment device is threadingly removed from the hub by abutting and forcing movement of the cage member in relation to the hub.

18. The device of claim 13 further comprising a sealing member disposed about the attachment device at the base of threaded portion.

19. A method of separating a constant velocity joint from a hub/bearing unit comprising the steps of:
providing a hub/bearing unit;
providing a constant velocity joint;
providing an attachment device for attaching the constant velocity joint to the hub/bearing unit, the attachment device comprising a shoulder portion and a threaded portion;
clamping the constant velocity joint to the hub/bearing unit wherein the attachment device, constant velocity joint and hub/bearing unit are adapted to apply an axial force to the constant velocity joint to remove the constant velocity joint from the hub/bearing unit as the attachment device is disengaged from the hub/bearing unit; and
separating the constant velocity joint from the hub/bearing unit.

20. The method of claim 19 wherein the hub/bearing unit comprises a threaded bore and the attachment device comprises a threaded portion and a shoulder portion.

21. The method of claim 19 wherein the hub/bearing unit comprises a bore and the attachment device comprises a threaded portion, a nut and a shoulder portion.

22. The method of claim 21 wherein the attachment device further comprises a tapered portion and a narrowed portion to provide sufficient stretch of the attaching member.

23. An assembly comprising:
a hub/bearing unit comprising a housing and a hub, the hub comprising a centrally located bore and a flange having an inboard surface, the hub/bearing unit further comprising a plurality of rolling elements between the housing and the hub that rotatingly support the hub within the housing and splines on an external diameter of the hub;
a constant velocity joint comprising an inner joint member, an outer joint member disposed about the inner joint member, and a plurality of balls between the inner joint member and the outer joint member wherein the balls transmit rotational force between the inner joint member and the outer joint member, the outer joint member comprising splines on an internal diameter thereof that mesh with the external splines of the hub/bearing unit; and
an attachment device having a threaded portion and a shoulder portion, wherein the shoulder portion contacts a backing surface of the constant velocity joint to clamp the constant velocity joint to the hub/bearing unit and is adapted to exert an axial force to the constant velocity joint in order to remove the constant velocity joint from the hub/bearing unit.

24. The assembly of claim 23 wherein the bore of the hub/bearing unit is a threaded bore and the threaded portion of the attachment device is attached to the hub at the threaded bore and the shoulder portion holds the outer joint member in a fixed relationship to the hub.

25. The assembly of claim 23 wherein the attachment device comprises an attaching member and attaching nut and the shoulder portion and threaded portion are located on the attaching member.

26. The assembly of claim 23 wherein the attachment device further comprises a non-circular shaped cavity capable of receiving a driver tool for rotation of the attachment device.

27. The assembly of claim 23 wherein the attachment device and the hub/bearing unit are adapted such that, as the attachment device is removed from the hub/bearing unit, the attachment device contacts a shaft attached to the inner joint member to force separation of the constant velocity joint from the hub.

28. The assembly of claim 23 wherein the inner joint member comprises an extended inner joint member and wherein the attachment device and the hub/bearing unit are adapted such that, as the attachment device is removed from the hub/bearing unit, the attachment device contacts the extended inner joint member to force separation of the constant velocity joint from the hub.

29. The assembly of claim 23 wherein the constant velocity joint further comprises a segment-of-a-sphere-shaped cage and wherein the attachment device and the hub/bearing unit are adapted such that, as the attachment device is removed from the hub/bearing unit, the attachment device contacts the cage to force separation of the constant velocity joint from the hub.

30. The assembly of claim 23 wherein the constant velocity joint and the hub/bearing unit are separately serviceable.

31. The assembly of claim 23 wherein the splines of the hub/bearing unit and the splines of the constant velocity joint are tight-fitted splines.

* * * * *

UNITED STATES PATENT AND TRADEMARK OFFICE
CERTIFICATE OF CORRECTION

PATENT NO. : 6,739,978 B2
DATED : May 25, 2004
INVENTOR(S) : Hacker et al.

It is certified that error appears in the above-identified patent and that said Letters Patent is hereby corrected as shown below:

Column 6,
Line 64, replace "treaded" with -- threaded --

Column 9,
Line 3, replace "bare" with -- bore --

Signed and Sealed this

Twentieth Day of July, 2004

JON W. DUDAS
*Acting Director of the United States Patent and Trademark Office*